Patented Apr. 2, 1929.

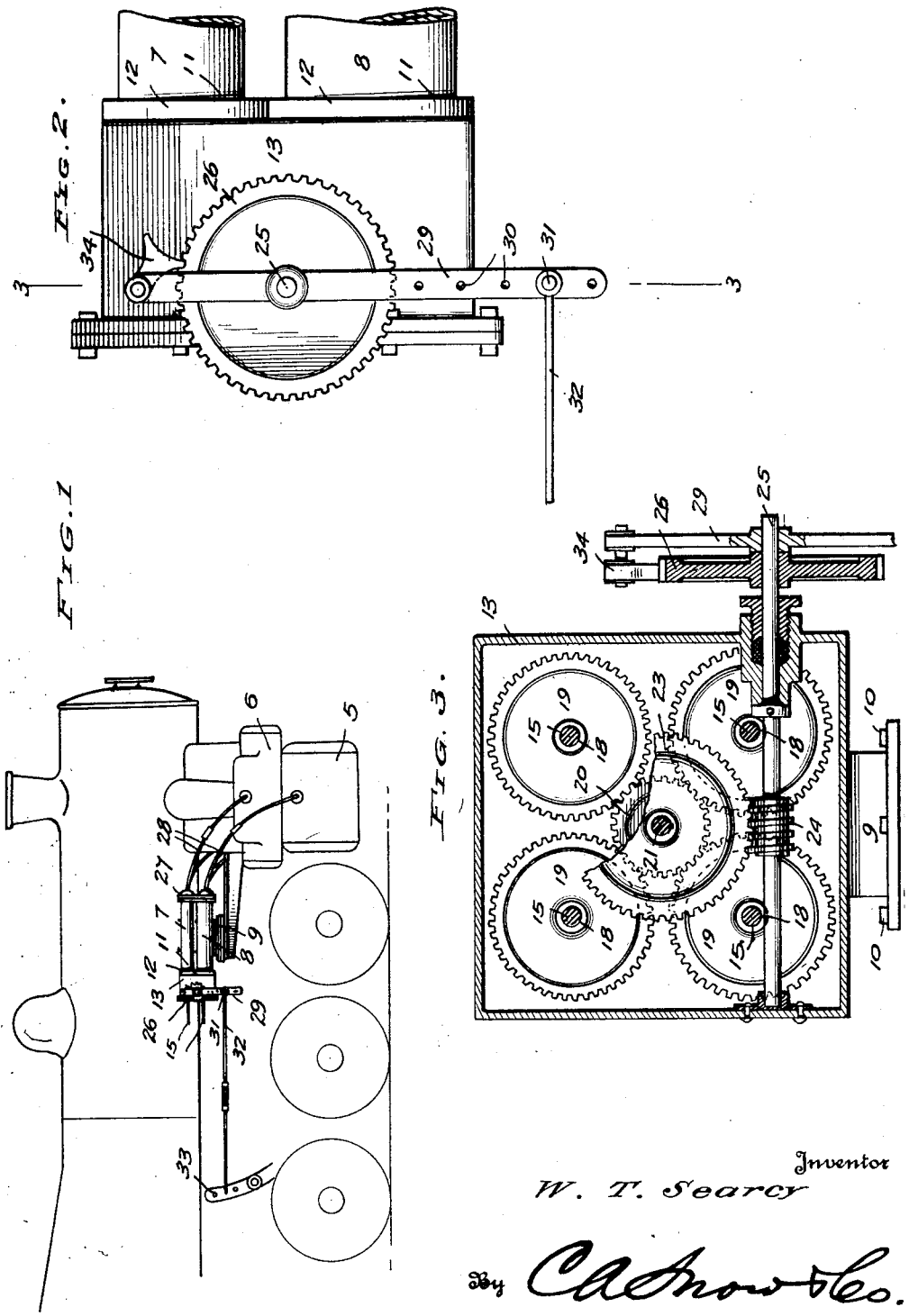

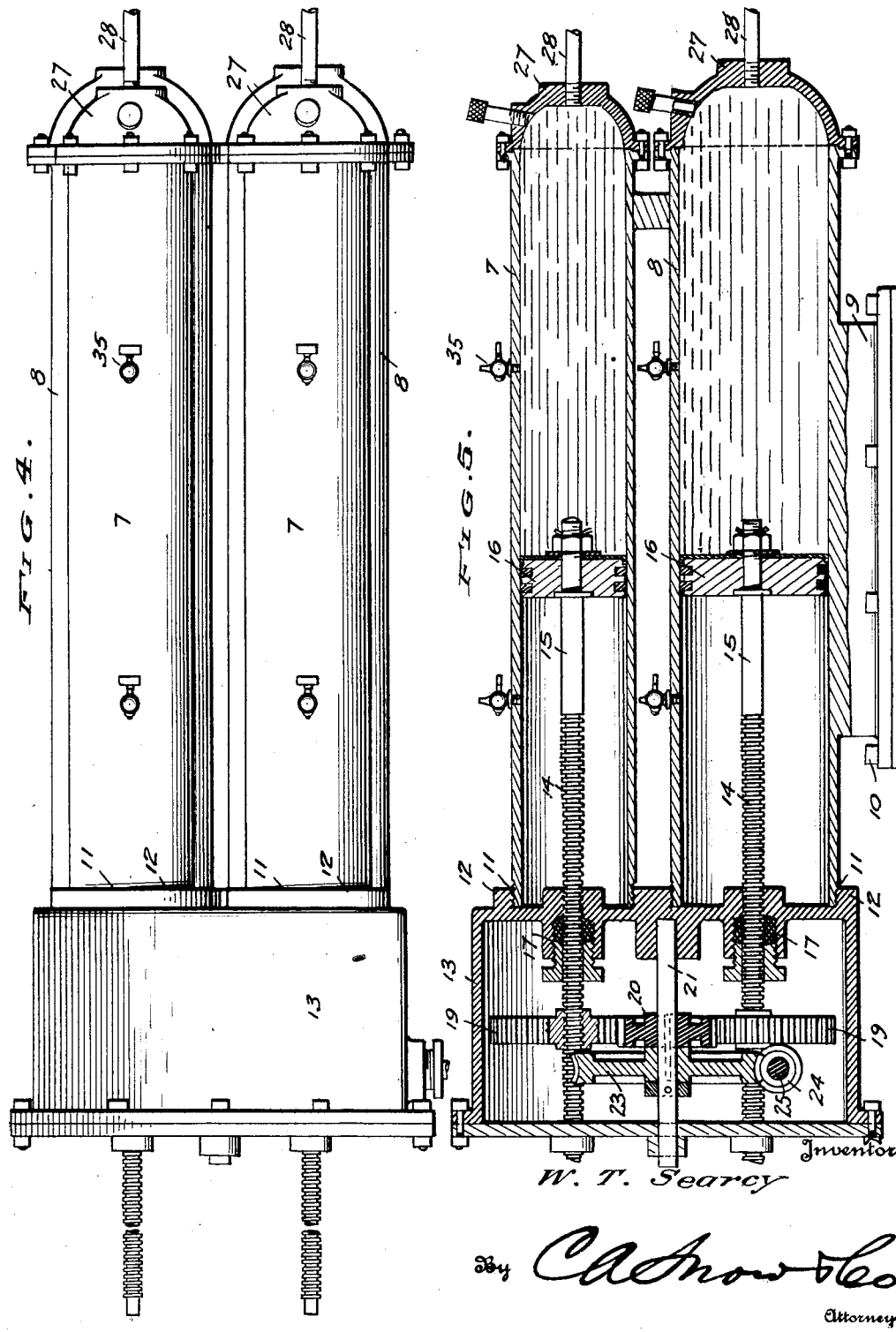

1,707,927

UNITED STATES PATENT OFFICE.

WILLIAM T. SEARCY, OF WACO, TEXAS, ASSIGNOR OF ONE-TENTH TO FRED J. BEDFORD, SR., OF DALLAS, TEXAS.

LUBRICATOR.

Application filed December 27, 1927. Serial No. 242,684.

This invention relates to lubricators and aims to provide novel means whereby a lubricant will be automatically fed to the valves and pistons of a locomotive automatically, the quantity of lubricant being fed being governed by the speed of the locomotive.

An important object of the invention is the provision of a lubricator of this type embodying a plurality of cylinders for containing the lubricant, pistons operating in the cylinders for forcing the lubricant from the cylinders, and a novel form of gearing for operating the pistons simultaneously.

A still further object of the invention is to provide a housing for the gearing whereby the gearing will operate submerged in oil, thereby insuring the true operation of the gearing, and reducing wear to the minimum.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view illustrating the application of the lubricator constructed in accordance with the invention.

Figure 2 is an enlarged elevational view showing the gear housing.

Figure 3 is a sectional view taken on line 3—3 of Figure 2.

Figure 4 is a plan view of the lubricator.

Figure 5 is a longitudinal sectional view therethrough.

Referring to the drawings in detail, the reference character 5 designates a cylinder at one side of a locomotive, and the reference character 6 designates the valve controlling the passage of steam thereto.

The lubricator embodying this invention includes a plurality of cylinders 7 and 8 respectively, the cylinders 7 being the upper cylinders, while the cylinders 8 are the lower cylinders. A pedestal 9 is formed integral with the lower cylinders and afford means whereby the lubricator may be bolted to the frame of a locomotive as by means of bolts 10.

The cylinders 7 and 8 are provided with threaded extremities 11 that fit within the threaded circular flanges 12 extending from the gear casing 13 as clearly shown by Figure 5 of the drawings. Openings are formed in the gear casing to accommodate the threaded portions 14 of the piston rods 15 on which the pistons 16 are mounted.

Suitable packings such as indicated at 17 are positioned around the threaded portions of the piston rods 15 to prevent the lubricating oil in which the gears to be hereinafter more fully described, operate from finding its way into the cylinders.

The threaded portions 14 of the pistons 15 extend through threaded openings in the gears 18, the gears being mounted for rotation within the gear housing as clearly shown by the drawings. The gear housing 13 is rectangular in formation and the gears 19 are positioned in the corners of the gear casing, where they mesh with the teeth of the gear 20 mounted between the gears 19, with the result that movement of the gear 20 will produce a relative movement of all the gears to advance the pistons through the cylinders.

The gear 20 is mounted on the shaft 21 that has its inner end supported within the bearing 22 so that the shaft 21 will rotate freely to accomplish its purpose. Associated with the gear 20 and keyed to the shaft 21 is a gear 23 that meshes with the worm 24 mounted on the shaft 25, the shaft 25 extending transversely through the gear housing where it supports the ratchet wheel 26 at the outer end thereof.

Removably supported at the outer ends of the cylinders are the heads 27 through which the pipes 28 extend, the pipes leading to certain valves and cylinders to supply grease thereto. In order that the amount of lubricant forced from the device will be regulated according to the speed at which the locomotive is moving, an arm 29 is provided, which arm is formed with a plurality of openings 30 to receive the pin 31 to which the connecting rod 32 is connected, the connecting rod 32 being however connected with the reversing link 33 of the usual locomotive construction. Thus it will be seen that due to the construction of the arm 29, the length of the stroke of rod 32 may be regulated to vary the amount of grease forced from the cylinders.

A ratchet 34 is mounted on one end of the arm 29 so that as the arm 29 is rocked during the operation of the device, the ratchet will move between the teeth with each reciprocation of the rod 32, to the end that the gears mounted in the gear housing will be rotated advancing the pistons in the cylinders and causing lubricating material to be forced from the cylinders.

From the foregoing it will be seen that when a locomotive equipped with a device of this character is moving rapidly, the rod 32 and arm 29 will operate faster than they will when the locomotive is operating slowly, with the result that the amount of grease or lubricant fed from the cylinders will be governed according to the speed at which the locomotive is moving.

It will further be seen that due to this construction, the device may be readily and easily secured at one side of a locomotive in such a way that the cylinders and valves on both sides of the locomotive will be lubricated by the device, simultaneously.

Filling pipes 36 extend through the heads of the cylinders that contain the lubricating material, and afford means whereby a suitable filling gun may be attached to the cylinders to fill them, or if a liquid lubricant is used, it will be seen that the liquid lubricant may be poured through these filling pipes.

Valves 35 are provided in the cylinders 7 and 8 so that the air in the cylinders will pass therefrom as the cylinders are being filled with the lubricant.

I claim:

1. A lubricator for supplying lubricating material to the cylinders and valve cylinders of a locomotive including a plurality of horizontal lubricating cylinders, a gear casing at one of the respective ends of the cylinders, piston rods operating in the lubricating cylinders and having pistons movable through the lubricating cylinders, said piston rods having threaded portions extending into the gear casing, gears in the gear casing and having threaded openings to receive the threaded portions of the piston rods, a gear mounted between the first mentioned gears and meshing therewith, said gears adapted to rotate intermittently and simultaneously to move the piston, rods, and pipes establishing communication between the cylinders of the engine and valve cylinders.

2. A lubricator for supplying lubricating material to the cylinders and valve cylinders of a locomotive, including a plurality of horizontally disposed cylinders, means for supporting the horizontally disposed cylinders on a locomotive, a gear casing supported at one of the respective ends of the horizontally disposed cylinders, piston rods carrying pistons, operating in the horizontally disposed cylinders for forcing lubricating material therefrom, said piston rods extending into the gear casing, gears in the gear casing and operating on the threaded portions of the piston rods, removable piston rods and pistons, means for operating the pistons intermittently and simultaneously, and means for controlling the operating means.

In testimony that I claim the foregoing as my own, I have hereto affixed my signature.

WILLIAM T. SEARCY.